(No Model.)
J. A. BROWN.
SPROCKET WHEEL.
No. 499,627. Patented June 13, 1893.
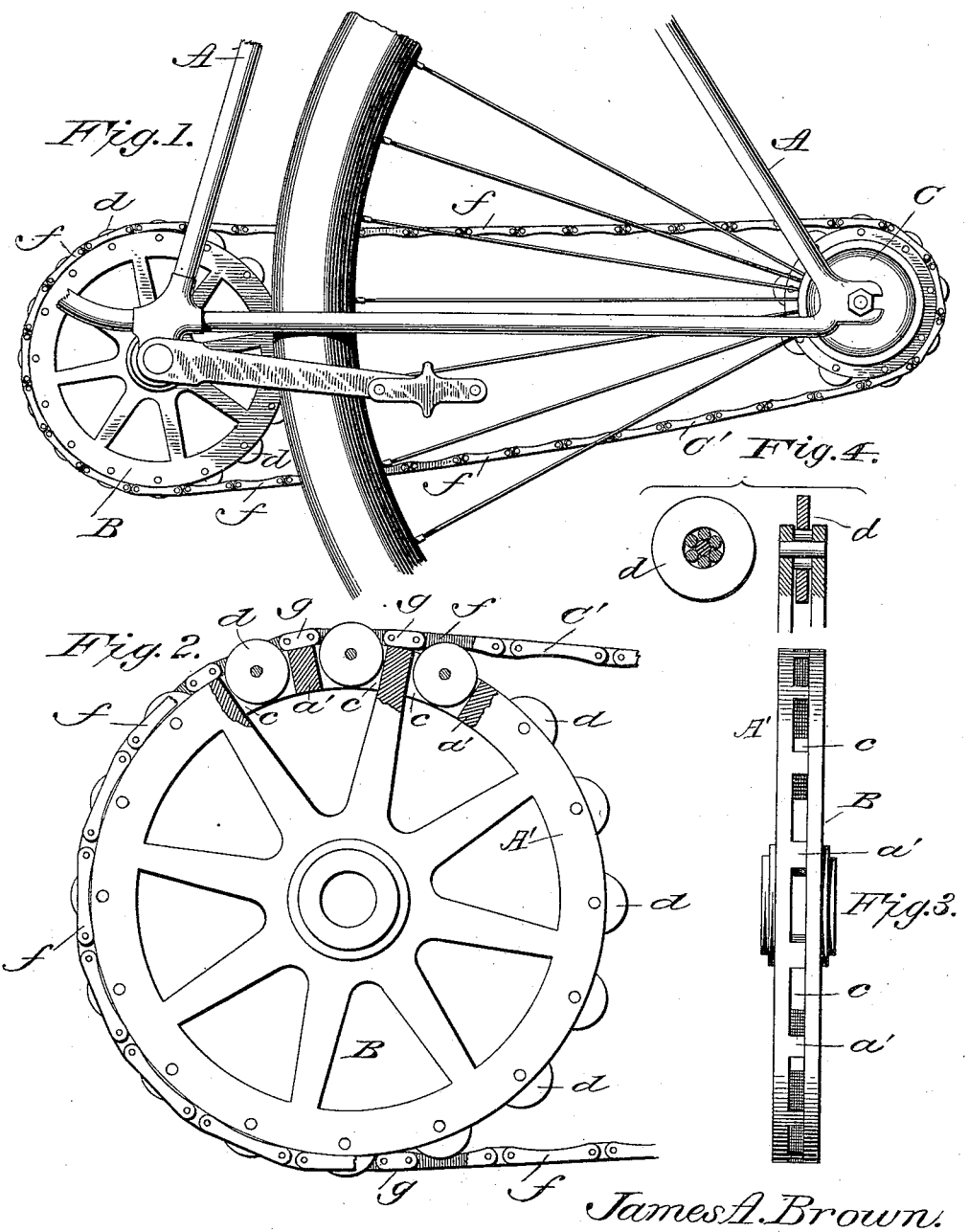
Witnesses
L. S. Elliott
T. W. Johnson
James A. Brown
Inventor
by [signature]
Attorney

UNITED STATES PATENT OFFICE.

JAMES A. BROWN, OF DUQUOIN, ILLINOIS.

SPROCKET-WHEEL.

SPECIFICATION forming part of Letters Patent No. 499,627, dated June 13, 1893.

Application filed November 23, 1892. Serial No. 452,926. (No model.)

*To all whom it may concern:*

Be it known that I, JAMES A. BROWN, a citizen of the United States of America, residing at Duquoin, in the county of Perry and State of Illinois, have invented certain new and useful Improvements in Sprocket-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in sprocket or chain wheels, the object of which is to provide a sprocket or chain wheel with rotatable disks with which the chain engages so that the friction will be reduced to a minimum; and the invention consists in a sprocket or chain wheel carrying disks which project beyond the periphery of the same and are adapted to contact with the cross-bars of the drive-chain, said disks being journaled so that the cross-bars will engage with the peripheries of the disks beyond their centers so as to cause the disks to rotate or turn, as will be hereinafter fully set forth.

In the accompanying drawings, forming part of this specification, Figure 1 is a side view of my improved gearing, showing the same applied to a bicycle. Fig. 2 is a side view of one of the sprocket wheels partly broken away. Fig. 3 is an edge view. Fig. 4 shows views of the disks detached and provided with anti-friction journals.

A designates the frame of the bicycle to which I have shown one form of my improved sprocket-wheel attached, B being the sprocket-wheel to which the crank-axle is connected and C the sprocket-wheel which is attached to the hub of the drive-wheel. These sprocket-wheels vary in size and number of disks according to the gear required, being in other respects substantially similar in construction.

My improved sprocket-wheel is preferably made up of two plates or disks, in which holes are drilled at specified distances to receive bearings or pins upon which the disks revolve, said pins also serving as rivets to connect the plates to each other; thus it will be noted that the bearings or pins serve two functions.

If desired one of the plates A' may have at regular intervals inwardly projecting blocks a' which bear against the adjoining plate and provide spaces c in which the disks d are journaled. Instead of the pins hereinbefore mentioned these disks may be provided with any approved form of bearing. The blocks are not essential, and the rim of the wheel may be made up of two annular plates connected to the hub by spokes. It will be noted that the larger part of each disk lies within the periphery of the wheel, so that the cross-bars of the chain will contact with curved surfaces, the center of the disks being within the periphery of the wheel. The center portion of the sprocket-wheel may be made in skeleton form instead of disks, the wheel being preferably open beneath the disks to prevent the accumulation of dirt.

C' designates the chain, which consists of parallel links $f f$ connected to cross-bars $g$, the inner or under edge of the links being slightly concave so as to better lie over the periphery of the sprocket-wheel. The distance between the cross-bars of the chain is slightly greater than the width of the part of the disk with which it contacts. The disks $d$ may be provided centrally with apertures of larger diameter than the pins or rivets so that between the pins and the disks may be placed rollers, balls, or any suitable form of anti-friction bearing. By means of this device I provide an easy running gearing, and as the disks are constantly turning new surfaces are presented and there will be but little wear upon the sprocket-wheel. As the outer portion of the disks, or the part which moves beyond the periphery of the wheel, is comparatively narrow I am enabled to employ a very narrow chain, which is advantageous in the propulsion of light machinery, such as bicycles. It will also be noted that the disks are very narrow and project beyond the periphery of the wheel only to such an extent that the cross-bars of the chain will positively engage therewith, the disks passing between the links of the chain so that said links will bear upon the periphery of the wheel on each side of the disks. By this construction the width of the chain can be greatly reduced, and it will be much lighter than any other sprocket chain of the same strength.

The width of the disks in practice need be but slightly thicker than the links of the chain, and the laterally projecting portions of the wheel are of the same width as the links, and a wheel and chain thus constructed are simple and there is but little more friction between the parts than there is with belt or rope gearing, with the advantage that there is no liability of the chain slipping.

I am aware that prior to my invention it has been proposed to provide a drive-wheel with balls carried in the periphery of the wheel to provide movable projections; and I am also aware that it has been proposed to provide a toothed wheel with rollers in the ends of said teeth, and I do not claim such as my invention; but What I do claim as new, and desire to secure by Letters Patent, is—

1. A sprocket wheel having a central series of projecting rotatable disks and uninterrupted continuous peripheral bearing surfaces on each side of the disks, for the purpose set forth.

2. In combination with a chain, a sprocket wheel having revoluble disks mounted to lie partially within the periphery of the wheel so that the contact of the cross-bars of the chain will not be on a line with the journals of the disks, the wheel having uninterrupted continuous bearing surfaces for the chain on each side of the disks, substantially as shown.

3. A sprocket or chain wheel having a central series of projecting rotatable disks and uninterrupted continuous bearing surfaces on each side of the disks, in combination, with a drive-chain adapted to engage with the rotatable disks and the peripheral bearing surfaces of the wheel, substantially as shown.

In testimony whereof I affix my signature in presence of two witnesses.

JAMES A. BROWN.

Witnesses:
HORACE L. BEALL,
E. W. JOHNSON.